(12) United States Patent
Hoshi

(10) Patent No.: US 8,240,834 B2
(45) Date of Patent: *Aug. 14, 2012

(54) INK FOR INK-JET RECORDING, INK CARTRIDGE, AND INK-JET RECORDING APPARATUS

(75) Inventor: Tatsunosuke Hoshi, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 1507 days.

This patent is subject to a terminal disclaimer.

(21) Appl. No.: 11/733,634

(22) Filed: Apr. 10, 2007

(65) Prior Publication Data

US 2007/0236551 A1 Oct. 11, 2007

(30) Foreign Application Priority Data

| Apr. 11, 2006 | (JP) | 2006-108593 |
| Dec. 20, 2006 | (JP) | 2006-342877 |
| Apr. 2, 2007 | (JP) | 2007-096389 |

(51) Int. Cl.
*B41J 2/175* (2006.01)

(52) U.S. Cl. ....... 347/100; 347/95; 106/31.13; 106/31.6

(58) Field of Classification Search .............. 347/95, 347/100; 106/31.6, 31.64, 31.13; 523/160, 523/161

See application file for complete search history.

(56) References Cited

U.S. PATENT DOCUMENTS

| 5,764,252 A | 6/1998 | Burr et al. |
| 5,841,448 A | 11/1998 | Moriyama et al. |
| 6,059,404 A | 5/2000 | Jaeger et al. |
| 6,147,140 A | 11/2000 | Jaeger et al. |
| 6,245,135 B1 | 6/2001 | Jaeger et al. |
| 6,281,917 B1 * | 8/2001 | Katsuragi et al. ............. 347/100 |
| 6,616,255 B2 | 9/2003 | Murakami et al. |
| 6,706,104 B2 * | 3/2004 | Takuhara et al. ............. 106/31.6 |
| 6,802,601 B2 | 10/2004 | Suzuki et al. |
| 6,886,928 B2 | 5/2005 | Sasaki et al. |
| 6,893,118 B2 | 5/2005 | Murakami et al. |

(Continued)

FOREIGN PATENT DOCUMENTS

DE 10146187 C1 3/2003

(Continued)

OTHER PUBLICATIONS

JP 2008-174703 is the foreign counterpart application of U.S. Appl. No. 11/733,621, filed Apr. 10, 2007.

(Continued)

*Primary Examiner* — Matthew Luu
*Assistant Examiner* — Rut Patel
(74) *Attorney, Agent, or Firm* — Banner & Witcoff, Ltd.

(57) ABSTRACT

An ink for ink-jet recording may contain a coloring agent and a marker. The coloring agent may contain a pigment. The marker may have a detector absorption peak for detecting the marker at a wavelength that is different from a wavelength of the maximum absorption peak of the coloring agent. The coloring agent and the marker may be contained in the ink in amounts that satisfy the following conditions (I) to (III):

(I) about $1.2 \leq A_2/A_3$;
(II) color difference ($\Delta E$) $\leq$ about 3; and
(III) about $1 \leq A_2 \leq$ about 10 in terms of a measurement optical path length of 1 mm, where $A_2$ denotes an absorbance at the wavelength of the detector absorption peak of the marker,
$A_3$ denotes a baseline absorbance at the wavelength of the detector absorption peak of the marker.

20 Claims, 4 Drawing Sheets

U.S. PATENT DOCUMENTS

| | | |
|---|---|---|
| 6,899,418 B2 | 5/2005 | Sasaki et al. |
| 6,905,313 B2 | 6/2005 | Sasa |
| 6,938,996 B2 | 9/2005 | Sasaki et al. |
| 6,942,327 B2 | 9/2005 | Suzuki et al. |
| 6,976,749 B2 | 12/2005 | Sasaki et al. |
| 7,077,512 B2 | 7/2006 | Kobayashi et al. |
| 7,914,138 B2 * | 3/2011 | Hoshi ............... 347/100 |
| 2002/0093557 A1 * | 7/2002 | Takuhara et al. ......... 347/100 |
| 2003/0035034 A1 | 2/2003 | Fukumoto |
| 2004/0050291 A1 * | 3/2004 | Taguchi et al. ......... 106/31.27 |
| 2004/0095432 A1 | 5/2004 | Kakutani |
| 2004/0110869 A1 | 6/2004 | Denninger et al. |
| 2005/0110823 A1 | 5/2005 | Kobayashi et al. |
| 2005/0116982 A1 | 6/2005 | Nakazawa |
| 2005/0279248 A1 | 12/2005 | Auslander |
| 2005/0279249 A1 | 12/2005 | Auslander |
| 2006/0170745 A1 * | 8/2006 | Deroover et al. ......... 347/100 |
| 2008/0097006 A1 | 4/2008 | Denninger et al. |

FOREIGN PATENT DOCUMENTS

| | | |
|---|---|---|
| EP | 1312653 A1 | 5/2003 |
| JP | 7-232440 | 9/1995 |
| JP | 11-172172 A | 6/1999 |
| JP | 2002-060664 A | 2/2002 |
| JP | 2002-192810 | 7/2002 |
| JP | 2002-292890 | 10/2002 |
| JP | 2002-292980 | 10/2002 |
| JP | 2004-181674 | 7/2004 |
| JP | 2005-510580 A | 4/2005 |
| JP | 2005-153459 | 6/2005 |
| JP | 2006-290950 A | 10/2006 |
| JP | 2008-174703 | 7/2008 |
| WO | 02061003 A | 8/2002 |
| WO | 2006012142 A | 2/2006 |

OTHER PUBLICATIONS

Extended European Search Report dated Jul. 6, 2007 in Application No. 07251559.6.

Office Action in Japanese Patent Application No. 2007-096389 dated Apr. 25, 2012.

Office Action in Japanese Patent Application No. 2007-096481 dated Apr. 25, 2012.

US 6,698,873, 03/2004, Sasaki (withdrawn)

* cited by examiner

INK FOR INK-JET RECORDING, INK CARTRIDGE, AND INK-JET RECORDING APPARATUS

CROSS REFERENCE TO RELATED APPLICATION

This application claims priority to Japanese Patent Application Nos. 2006-108593 filed on Apr. 11, 2006, 2006-342877 filed on Dec. 20, 2006, and 2007-96389 filed on Apr. 2, 2007, the entire contents of which are hereby incorporated by reference.

BACKGROUND

1. Field

Aspects of the present invention relate generally to an ink for ink-jet recording, an ink cartridge, and an ink-jet recording apparatus.

2. Description of the Related Art

Conventionally, an ink-jet recording apparatus ejects respective colors of yellow, magenta, cyan, and black onto a printing material such as paper. The inks are ejected as droplets from fine nozzles. The droplets of the inks form ink dots on the printing material, so that image data is recorded. In color recording, the inks are mixed at the surface of the printing material according to the image data to express various colors.

When an ink cartridge filled with an inappropriate color ink is mounted on an ink-jet recording apparatus, the intended color record cannot be obtained. When the ink with which the ink cartridge is filled has the same color as that of an appropriate ink but is different in ink composition from the appropriate ink, there is a possibility that the ink may be solidified or deposited inside or outside the fine nozzle, which may hinder normal printing. In order to solve such problems, there is a demand for a method of identifying whether or not the ink cartridge filled with an appropriate ink has been mounted properly on an ink-jet recording apparatus.

In order to meet the demand, the following method is being tested. That is, whether an appropriate ink is used is identified by measuring an absorbance that is obtained when the ink is irradiated with light having the wavelength of the maximum absorption peak. However, the absorbance of an ink stock solution is very high and therefore cannot be measured. Accordingly, in order to identify whether an appropriate ink is used by the aforementioned method, it is necessary to dilute the ink with a solvent such as water and then to measure the absorbance. Hence, in ink-jet recording apparatuses, it has been very difficult to identify simply whether an appropriate ink is used by the aforementioned method.

The following method also is being tested. That is, an ink cartridge with an identification label attached thereto that indicates the color of ink is mounted on a predetermined place of an ink-jet recording apparatus while being checked visually. A method of identifying an ink cartridge with an IC chip attached to the ink cartridge also has been proposed. In the aforementioned method, the main body of the ink-jet recording apparatus reads the information of the IC chip to identify the ink cartridge. In all the above-mentioned methods, however, it is not possible to judge whether the ink itself with which the ink cartridge has been filled is appropriate or not. In all the above-mentioned methods, the cost for the ink cartridge is high.

SUMMARY

An ink, for an ink-jet recording device, in accordance with at least one aspect of the present invention is an ink for ink-jet recording containing a coloring agent. The coloring agent contains a pigment. The ink further contains a marker. The marker has a detector absorption peak for detecting the marker at a wavelength that is different from a wavelength of the maximum absorption peak of the coloring agent. The coloring agent and the marker are contained in the ink in amounts that satisfy the following conditions (I) to (III):

(I) about $1.2 \leq A_2/A_3$;
(II) color difference $(\Delta E) \leq$ about 3; and
(III) about $1 \leq A_2 \leq$ about 10 in terms of a measurement optical path length of 1 mm, where $A_2$ denotes an absorbance at the wavelength of the detector absorption peak of the marker,
$A_3$ denotes a baseline absorbance at the wavelength of the detector absorption peak of the marker, $$\Delta E = \{(L^*_1 - L^*_2)^2 + (a^*_1 - a^*_2)^2 + (b^*_1 - b^*_2)^2\}^{1/2},$$

$L^*_1$ denotes an $L^*$ value of the ink,
$L^*_2$ denote an $L^*$ value of a control ink,
$a^*_1$ denotes an $a^*$ value of the ink,
$a^*_2$ denotes an $a^*$ value of the control ink,
$b^*_1$ denotes a $b^*$ value of the ink,
$b^*_2$ denotes a $b^*$ value of the control ink, and
the control ink is an ink having the same composition as a composition of the ink except that water is used instead of the marker.

An ink cartridge in accordance with one or more aspects of the present invention is an ink cartridge containing an ink for ink-jet recording. The ink contains a coloring agent and a marker. The coloring agent contains a pigment. The marker has a detector absorption peak for detecting the marker at a wavelength that is different from a wavelength of the maximum absorption peak of the coloring agent. The coloring agent and the marker are contained in the ink in amounts that satisfy the following conditions (I) to (III):

(I) about $1.2 \leq A_2/A_3$;
(II) color difference $(\Delta E) \leq$ about 3; and
(III) about $1 \leq A_2 \leq$ about 10 in terms of a measurement optical path length of 1 mm, where $A_2$ denotes an absorbance at the wavelength of the detector absorption peak of the marker,
$A_3$ denotes a baseline absorbance at the wavelength of the detector absorption peak of the marker, $$\Delta E = \{(L^*_1 - L^*_2)^2 + (a^*_1 - a^*_2)^2 + (b^*_1 - b^*_2)^2\}^{1/2},$$

$L^*_1$ denotes an $L^*$ value of the ink,
$L^*_2$ denotes an $L^*$ value of a control ink,
$a^*_1$ denotes an $a^*$ value of the ink,
$a^*_2$ denotes an $a^*$ value of the control ink,
$b^*_1$ denotes a $b^*$ value of the ink,
$b^*_2$ denotes a $b^*$ value of the control ink, and
the control ink is an ink having the same composition as a composition of the ink except that water is used instead of the marker.

An ink-jet recording apparatus of at least one aspect of the present invention is an ink-jet recording apparatus on which an ink cartridge is mounted. The ink cartridge contains an ink for ink-jet recording. The ink contains a coloring agent and a marker. The coloring agent contains a pigment. The marker has a detector absorption peak for detecting the marker at a wavelength that is different from a wavelength of the maximum absorption peak of the coloring agent. The coloring agent and the marker are contained in the ink in amounts that satisfy the following conditions (I) to (III):

(I) about $1.2 \leq A_2/A_3$;
(II) color difference $(\Delta E) \leq$ about 3; and
(III) about $1 \leq A_2 \leq$ about 10 in terms of a measurement optical path length of 1 mm, where $A_2$ denotes an absorbance at the wavelength of the detector absorption peak of the marker,
$A_3$ denotes a baseline absorbance at the wavelength of the detector absorption peak of the marker, $$\Delta E=\{(L{*}_1-L{*}_2)^2+(a{*}_1-a{*}_2)^2+(b{*}_1-b{*}_2)^2\}^{1/2},$$

$L{*}_1$ denotes an L* value of the ink,
$L{*}_2$ denotes an L* value of a control ink,
$a{*}_1$ denotes an a* value of the ink,
$a{*}_2$ denotes an a* value of the control ink,
$b{*}_1$ denotes a b* value of the ink,
$b{*}_2$ denotes a b* value of the control ink, and
the control ink is an ink having the same composition as a composition of the ink except that water is used instead of the marker. The ink-jet recording apparatus may include an optical measurement means and a judgment means. The optical measurement means measures an absorbance of the ink at the wavelength of the detector absorption peak of the marker to generate data of the absorbance. The judgment means judges the type of the ink according to the data of the absorbance to generate information of the ink contained in the ink cartridge.

DETAILED DESCRIPTION

An ink for ink-jet recording of at least one aspect of the present invention is an ink containing a coloring agent. The coloring agent contains pigments. In at least one or more inks, one of the pigments exhibits the maximum absorption peak of the coloring agent. The ink may further contain a marker. The marker has a detector absorption peak for detecting the marker at a wavelength that is different from a wavelength of the maximum absorption peak of the coloring agent.

Figure 1:
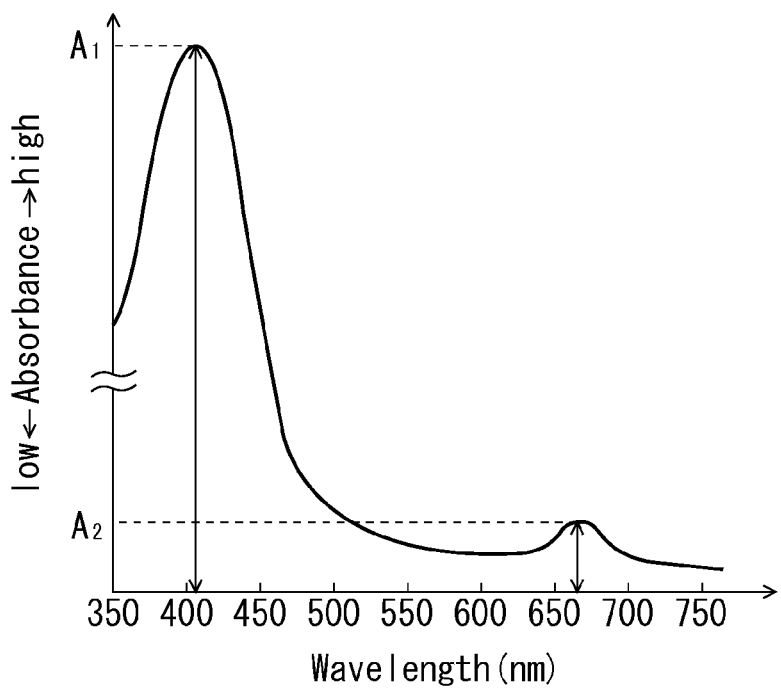
FIG. 1 shows an absorption spectrum that schematically indicates an example of an absorption curve of a yellow ink for ink-jet recording according to at least one aspect of the present invention.

Next, the absorption curve of the inks according to at least one aspect of the present invention is described with respect to the case of a yellow ink as an example. FIG. 1 schematically shows an example of an absorption curve of the yellow ink. As shown in FIG. 1, in this yellow ink, the maximum absorption peak (the peak where the absorbance is $A_1$) of the coloring agent is found around 410 nm and the detector absorption peak (the peak where the absorbance is $A_2$) of the marker is found around 670 nm. In FIG. 1, in order to make it easily understandable, the ratio between the absorbance ($A_1$) and the absorbance ($A_2$) is allowed to be different from the actual ratio.

Figure 2:
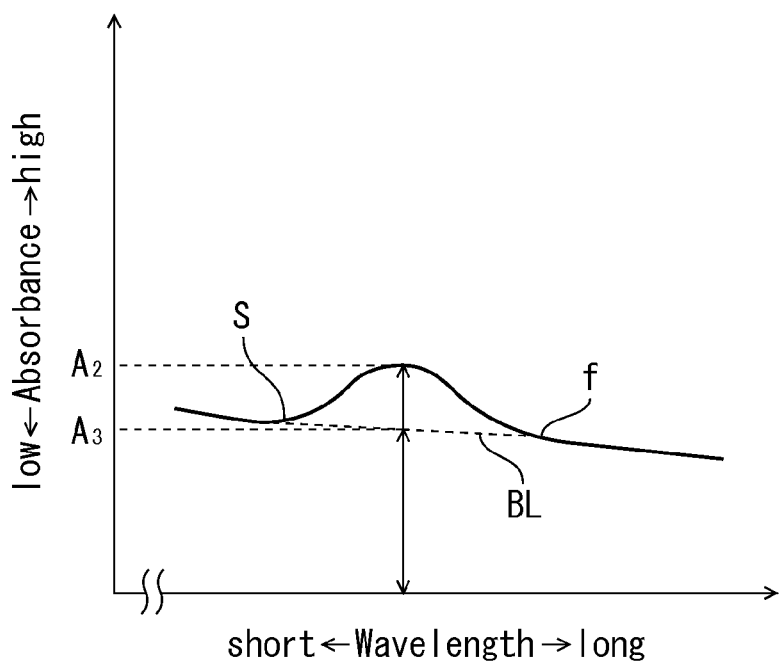
FIG. 2 shows an absorption spectrum that indicates an example of an absorption curve around a wavelength of the detector absorption peak of the marker of the ink for ink-jet recording according to at least one aspect of the present invention.

FIG. 2 shows an example of an absorption curve around the wavelength of the detector absorption peak of the marker of the ink according to at least one aspect of the present invention. The coloring agent and the marker are contained in the ink in amounts that satisfy the following condition (I) as shown in FIG. 2:

(I) about $1.2 \leq A_2/A_3$,
where $A_2$ denotes an absorbance at the wavelength of the detector absorption peak of the marker, and
$A_3$ denotes a baseline absorbance at the wavelength of the detector absorption peak of the marker.

The baseline absorbance ($A_3$) is described as follows. First, in the absorption curve of the ink of at least one aspect of the present invention, the starting point (s) and the ending point (f) of a rise of the detector absorption peak are connected with a straight line to obtain a baseline (BL). Next, the absorbance at the baseline (BL) is determined at the wavelength of the detector absorption peak. The absorbance thus determined is the baseline absorbance ($A_3$). That is, the baseline absorbance ($A_3$) is an absorbance at the wavelength of the detector absorption peak of an ink prepared with the marker being removed from the ink of at least one aspect of the present invention. The coloring agent and the marker are contained in the ink in amounts that satisfy the condition (I). This allows the marker to be detected. Preferably, the condition (I) is about $1.5 \leq A_2/A_3$.

The coloring agent and the marker are contained in the ink in amounts that satisfy the following condition (II):
(II) color difference ($\Delta E$) $\leq$ about 3, $$\text{where } \Delta E=\{(L{*}_1-L{*}_2)^2+(a{*}_1-a{*}_2)^2+(b{*}_1-b{*}_2)^2\}^{1/2},$$

$L{*}_1$ denotes an L* value of the ink,
$L{*}_2$ denotes an L* value of a control ink,
$a{*}_1$ denotes an a* value of the ink,
$a{*}_2$ denotes an a* value of the control ink,
$b{*}_1$ denotes a b* value of the ink,
$b{*}_2$ denotes a b* value of the control ink, and
the control ink is an ink having the same composition as a composition of the ink except that water is used instead of the marker.

These values are according to the L* a* b* colorimetric system standardized in International Commission on Illumination (CIE) in 1976 (CIE 1976 (L* a* b*) colorimetric system) (see JIS (Japanese Industrial Standards) Z8729).

The color difference ($\Delta E$) may be measured by the method described later in the section of Examples, for example. Any person skilled in the art can obtain the color difference ($\Delta E$) easily by adjusting the amounts of the coloring agent and marker to be added, without carrying out an excessive amount of trial and error.

The coloring agent and the marker are contained in the ink in amounts that satisfy the following condition (III):
(III) about $1 \leq A_2 \leq$ about 10 in terms of a measurement optical path length of 1 mm,
where $A_2$ denotes an absorbance at the wavelength of the detector absorption peak of the marker.

The expression "in terms of a measurement optical path length of 1 mm" denotes that for example, when the measurement optical path length is 10 mm, the value of the absorbance actually measured is divided by 10. In at least one aspect of the present invention, when being measured with an ink that is diluted, the absorbance ($A_2$) is a value indicated in terms of an ink stock solution (a value obtained by multiplying the value of the absorbance actually measured with a diluted ink, by a dilution ratio). When the absorbance ($A_2$) is about 1 to about 10, the marker can be detected with high detection accuracy. Any person skilled in the art can obtain the absorbance ($A_2$) easily by adjusting the amounts of the coloring agent and marker to be added, without carrying out an excessive amount of trial and error.

Preferably, the detector absorption peak of the marker is in a position completely separated from the optical absorption range of the coloring agent. However, the detector absorption peak may be in the shoulder of the optical absorption curve of the coloring agent as long as the detector absorption peak can be detected. Preferably, the ink of at least one aspect of the present invention further satisfies the following condition (IV):

(IV) about 50 nm$\leq |\lambda_1 - \lambda_2|$, where $\lambda_1$ denotes the wavelength of the maximum absorption peak of the coloring agent, and $\lambda_2$ denotes the wavelength of the detector absorption peak of the maker.

In the condition (IV), $|\lambda_1 - \lambda_2|$ is an absolute value of the difference between the wavelength ($\lambda_1$) of the maximum absorption peak of the coloring agent and the wavelength ($\lambda_2$) of the detector absorption peak of the marker. That is, when the condition (IV) is satisfied, the wavelength of the maximum absorption peak of the coloring agent and the wavelength of the detector absorption peak of the marker are at least about 50 nm apart from each other.

The respective amounts of the coloring agent and marker to be added depend on the types thereof. With respect to the total amount of the ink, the amount of the coloring agent to be added is, for example, in the range of about 0.1% by weight to about 15% by weight, preferably in the range of about 0.3% by weight to about 13% by weight, and more preferably in the range of about 0.1% by weight to about 10% by weight. With respect to the total amount of the ink, the amount of the marker to be added is, for instance, in the range of about 0.001% by weight to about 0.3% by weight, preferably in the range of about 0.01% by weight to about 0.1% by weight.

Preferably, the coloring agent and the marker are contained in the ink in amounts that further satisfy the following condition (V):

(V) about $15 \leq A_1/A_2 \leq$ about 200, where $A_1$ denotes the absorbance at the wavelength of the maximum absorption peak of the coloring agent, and $A_2$ denotes the absorbance at the wavelength of the detector absorption peak of the marker.

When the value of ($A_1/A_2$) is at least about 15, the influence of the marker on the color of the ink can be reduced. When the value of ($A_1/A_2$) is about 200 or lower, the maker can be detected with higher detection accuracy.

In the ink of at least one aspect of the present invention, the detector absorption peak may be the maximum absorption peak of the marker or a different peak from that, as long as it can be detected.

With respect to the coloring agent, one pigment may be used individually or at least two coloring agents may be used in combination. When at least two coloring agents are used in combination, the maximum absorption peak is the highest absorption peak among the maximum absorption peaks of the respective coloring agents. The coloring agent may contain a dye. However, when consideration is given to dispersibility, it is preferable that the coloring agent contain a pigment only. However, the present invention is not limited to this.

For the marker, one material (for example, a dye or a pigment) may be used individually or at least two materials may be used in combination. The detector absorption peak to be employed when at least two materials are used in combination for the marker may be selected arbitrarily from absorption peaks of the marker that exhibits the absorbance ($A_2$) that satisfies the conditions (I) and (III).

The following Table 1 shows examples of preferred combinations of a coloring agent that shows the maximum absorption peak and a marker having a detector absorption peak in a yellow ink. The present invention, however, is not limited to the following examples.

TABLE 1

| Maximum Absorption Peak of Coloring Agent About 360 nm to about 450 nm | Detector Absorption Peak of Marker About 550 nm to about 780 nm |
| --- | --- |
| CAB-O-JET ® 270Y | Dye |
| | C.I. Direct Blue 199 |
| | C.I. Acid Red 52 |
| | C.I. Acid Blue 9 |
| | C.I. Acid Blue 175 |
| | Pigment |
| | CAB-O-JET ® 250C |
| | CAB-O-JET ® 554B |
| | CAB-O-JET ® 1027R |

The following Table 2 shows examples of preferred combinations of a coloring agent that shows the maximum absorption peak and a marker having a detector absorption peak in a magenta ink. The present invention, however, is not limited to the following examples.

TABLE 2

| Maximum Absorption Peak of Coloring Agent About 500 nm to about 570 nm | Detector Absorption Peak of Marker About 600 nm to about 780 nm |
| --- | --- |
| CAB-O-JET ® 260M | Dye |
| | C.I. Direct Blue 199 |
| | C.I. Acid Blue 9 |
| | C.I. Acid Blue 175 |
| | Pigment |
| | CAB-O-JET ® 250C |
| | CAB-O-JET ® 554B |

Figure 3:
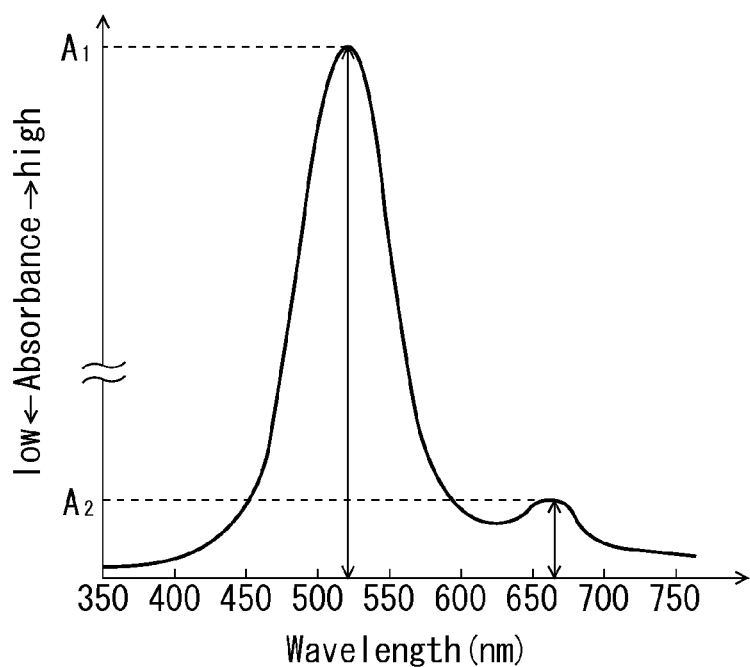
FIG. 3 shows an absorption spectrum that schematically indicates an example of an absorption curve of a magenta ink for ink-jet recording according to at least one aspect of the present invention.

FIG. 3 schematically shows an example of the absorption curve of the magenta ink of at least one aspect of the present invention. As shown in FIG. 3, this magenta ink has the maximum absorption peak (the peak where the absorbance is $A_1$) of the coloring agent found around 520 nm and the detector absorption peak (the peak where the absorbance is $A_2$) of the marker found around 670 nm. In FIG. 3, in order to make it easily understandable, the ratio between the absorbance ($A_1$) and the absorbance ($A_2$) is allowed to be different from the actual ratio.

The following Table 3 shows examples of preferred combinations of a coloring agent that shows the maximum absorption peak and a marker having a detector absorption peak in a cyan ink. The present invention, however, is not limited to the following examples.

TABLE 3

| Maximum Absorption Peak of Coloring Agent About 570 nm to about 780 nm | Detector Absorption Peak of Marker About 450 nm to about 500 nm |
|---|---|
| CAB-O-JET ® 250C | Dye |
| | C.I. Acid Orange 122 C.I. Acid Orange 80 Pigment |
| | C.I. Pigment Orange 71 |

Figure 4:
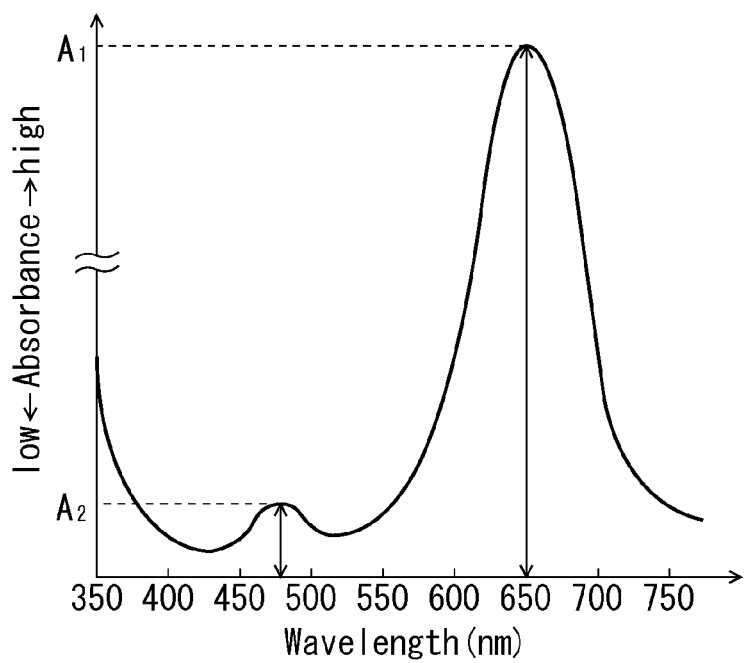
FIG. 4 shows an absorption spectrum that schematically indicates an example of an absorption curve of a cyan ink for ink-jet recording according to at least one aspect of the present invention.

FIG. 4 schematically shows an example of the absorption curve of the cyan ink of the present invention. As shown in FIG. 4, this cyan ink has the maximum absorption peak (the peak where the absorbance is $A_1$) of the coloring agent found around 650 nm and the detector absorption peak (the peak where the absorbance is $A_2$) of the marker found around 480 nm. In FIG. 4, in order to make it easily understandable, the ratio between the absorbance ($A_1$) and the absorbance ($A_2$) is allowed to be different from the actual ratio.

In the ink of at least one aspect of the present invention, it is preferable that the wavelength of the maximum absorption peak and the wavelength of the detector absorption peak be both in the visible light range (about 360 nm to about 780 nm). However, the present invention is not limited to this. In the inks of at least one aspect of the present invention, the wavelength of the detector absorption peak may be, for instance, in the infrared range or ultraviolet range, as long as the detector absorption peak can be detected.

Preferably, the ink of at least one aspect of the present invention contains, as a solvent, a mixed solvent of water and a water-soluble organic solvent in addition to the coloring agent and the marker.

The water is preferably deionized water. The ratio of the water to the total amount of the ink (water ratio) is determined in a wide range according to the type and composition of the water-soluble organic solvent and desired ink characteristics. The water ratio is, for instance, in the range of about 10% by weight to about 95% by weight, preferably in the range of about 40% by weight to about 80% by weight.

The water-soluble organic solvent is classified into a humectant and a penetrant. The humectant prevents an ink from drying at the tip of the ink-jet head, for example. The penetrant accelerates the drying rate on the printing paper.

The humectant is not limited, and examples thereof include lower alcohols, amides, ketones, ketoalcohols, ethers, polyalcohols, alkylene glycols, 2-pyrrolidone, N-methyl-2-pyrrolidone, 1,3-dimethyl-2-imidazolidinone, etc. The lower alcohols are not limited, and examples thereof include methyl alcohol, ethyl alcohol, n-propyl alcohol, isopropyl alcohol, n-butyl alcohol, sec-butyl alcohol, tert-butyl alcohol, etc. The amides are not limited, and examples thereof include dimethylformamide, dimethylacetamide, etc. The ketones are not limited, and examples thereof include acetone, etc. The ketoalcohols are not limited, and examples thereof include diacetone alcohol, etc. The ethers are not limited, and examples thereof include tetrahydrofuran, dioxane, etc. The polyalcohols are not limited, and examples thereof include polyethylene glycol, polypropylene glycol, glycerin, etc. The alkylene glycols are not limited, and examples thereof include ethylene glycol, propylene glycol, butylene glycol, diethylene glycol, triethylene glycol, dipropylene glycol, tripropylene glycol, thiodiglycol, hexylene glycol, etc. Among them, polyalcohols such as glycerin, and alkylene glycols are preferable. One of the humectants may be used individually or a mixture of two or more of them may be used.

The amount of the humectant to be added is not particularly limited. With respect to the total amount of the ink, the amount of the humectant to be added is, for instance, in the range of about 0 to about 95% by weight, preferably in the range of about 10% by weight to about 80% by weight, and more preferably in the range of about 10% by weight to about 50% by weight.

The penetrant is not limited, and examples thereof include glycol ethers. The glycol ethers are not limited, and examples thereof include ethylene glycol methyl ether, ethylene glycol ethyl ether, ethylene glycol propyl ether, diethylene glycol methyl ether, diethylene glycol ethyl ether, diethylene glycol propyl ether, diethylene glycol butyl ether, triethylene glycol methyl ether, triethylene glycol ethyl ether, triethylene glycol propyl ether, triethylene glycol butyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, tripropylene glycol methyl ether, tripropylene glycol ethyl ether, tripropylene glycol propyl ether, tripropylene glycol butyl ether, etc. One of the penetrants may be used individually or a mixture of two or more of them may be used.

The amount of the penetrant to be added is, for instance, in the range of about 0 to about 20% by weight. The aforementioned range allows the permeability of the ink into paper to be further suitable. The amount of the penetrant to be added is preferably in the range of about 0.1% by weight to about 15% by weight, and more preferably in the range of about 1% by weight to about 10% by weight.

One or more aspects of the ink of the present invention further may contain a conventionally known additive as required. Examples of the additive include a viscosity modifier, a surface tension modifier, a mildew-proofing agent, etc. The viscosity modifier is not limited. Examples thereof include polyvinyl alcohol, cellulose, water-soluble resin, etc.

The ink of at least one aspect of the present invention may be prepared by uniformly mixing the coloring agent and the marker and other additive components such as water, a water-soluble organic solvent, etc., and then removing insolubles with a filter, for example.

As described above, the ink of at least one aspect of the present invention contains the marker. Accordingly, the ink of at least one aspect of the present invention can be distinguished from inks that do not contain the marker (inks other than the ink of the present invention) by measuring the absorbance at the wavelength of the detector absorption peak of the marker.

An ink cartridge of at least one aspect of the present invention is an ink cartridge containing an ink of at least one aspect of the present invention. The main body of the ink cartridge of the present invention may be a conventionally known main body. As described above, the ink of the present invention can be distinguished from other inks. The ink cartridge of at least one aspect of the present invention contains an ink of at least one aspect of the present invention and therefore can be distinguished from ink cartridges containing only other inks.

Next, an ink-jet recording apparatus of at least one aspect of the present invention is described. The aforementioned ink cartridge of at least one aspect of the present invention is mounted on the ink-jet recording apparatus of at least one aspect of the present invention. The ink-jet recording apparatus of at least one aspect of the present invention includes an optical measurement device and a judgment device. Except for these points, the configuration of the ink-jet recording apparatus of one or more aspects the present invention may be the same as that of a conventionally known ink-jet recording apparatus, for example.

Figure 5:
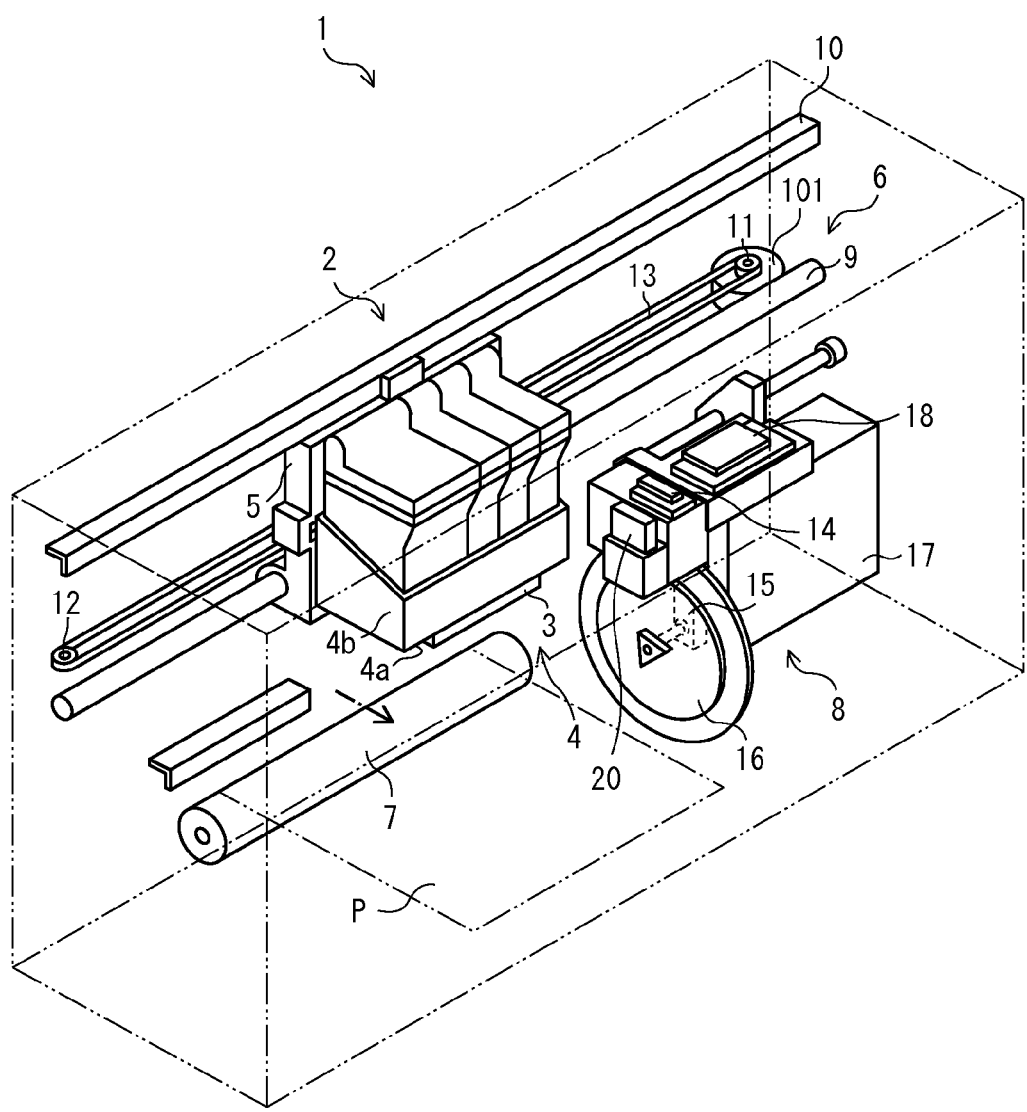
FIG. 5 is a schematic perspective view showing the configuration of an example of the ink-jet recording apparatus according to at least one aspect of the present invention.

FIG. 5 shows the configuration of an example of the ink-jet recording apparatus according to at least one aspect of the present invention. As shown in FIG. 5, this ink-jet recording apparatus 1 includes, as main components, four ink cartridges 2, an ink-jet head 3, a head unit 4, a carriage 5, a drive unit 6, a platen roller 7, and a purge unit 8. The ink-jet recording apparatus 1 also includes the optical measurement device and the judgment device, although they are omitted in FIG. 5. The details of the optical measurement device and the judgment device are described later.

The four ink cartridges 2 contain one of the four-color inks, yellow ink, magenta ink, cyan ink, and black ink. The color inks of yellow, magenta, and cyan are inks of at least one aspect of the present invention. The ink-jet head 3 performs printing on a printing material P such as printing paper. The head unit 4 is provided with the ink-jet head 3. The four ink cartridges 2 and the head unit 4 are mounted on the carriage 5. The drive unit 6 reciprocates the carriage 5 in a straight line direction. The platen roller 7 extends in a reciprocating direction of the carriage 5 and is disposed so as to be opposed to the ink-jet head 3.

The four ink cartridges 2 are attached between a pair of side covers 4b formed at both sides of a placing portion 4a of the head unit 4.

The drive unit 6 includes a carriage shaft 9, a guide plate 10, two pulleys 11 and 12, and an endless belt 13. The carriage shaft 9 is disposed at a lower end portion of the carriage 5 and extends in parallel with the platen roller 7. The guide plate 10 is disposed at an upper end portion of the carriage 5 and extends in parallel with the carriage shaft 9. The two pulleys 11 and 12 are disposed in positions corresponding to both end portions of the carriage shaft 9 and between the carriage shaft 9 and the guide plate 10. The endless belt 13 is stretched between the two pulleys 11 and 12.

In this ink-jet recording apparatus 1, as the pulley 11 is rotated in normal and reverse directions by drive of a carriage motor 101, the carriage 5 that is connected to the endless belt 13 is reciprocated linearly, along the carriage shaft 9 and the guide plate 10, in accordance with the normal and reverse rotation of the pulley 11.

The printing material P is fed from a paper feeding cassette (not shown) provided on a side of or under the ink-jet recording apparatus 1. Then the printing material P is introduced between the ink-jet head 3 and the platen roller 7. Then, it is subjected to predetermined printing with inks ejected from the ink-jet head 3. After that, the printing material P is discharged from the ink-jet recording apparatus 1. Mechanisms of feeding and discharging the printing material P are omitted in FIG. 5.

The purge unit 8 is provided on a side of the platen roller 7. The purge unit 8 is disposed so as to be opposed to the ink-jet head 3 when the head unit 4 is placed in a reset position (in this example, above the purge unit 8). The purge unit 8 includes a purge cap 14, a pump 15, a cam 16, and an ink reservoir 17. The purge cap 14 covers a plurality of nozzles (not shown) of the ink-jet head 3 when the head unit 4 is placed in a reset position. The pump 15 sucks defective ink containing, for example, air bubbles trapped inside the ink-jet head 3 by being driven by the cam 16. Thereby the ink-jet head may be considered to be restored. The sucked defect ink is stored in the ink reservoir 17.

A wiper member 20 is provided in a position on the platen roller 7 side of the purge unit 8 while being adjacent to the purge unit 8. The wiper member 20 may be formed in the shape of a spatula and wipes the nozzle-formed surface of the ink-jet head 3 along displacement of the carriage 5. In FIG. 5, in order to prevent the ink from drying, the cap 18 covers a plurality of nozzles of the ink-jet head 3 that returns to the reset position after completion of printing.

The optical measurement device measures the absorbance of the ink at the wavelength of the detector absorption peak of the marker to generate data of the absorbance. The optical measurement device may include a light source and a photodetection device, for example.

The light source is not particularly limited as long as it emits light with the wavelength of the detector absorption peak. For example, a conventionally known light source may be used. Specifically, examples of the light source include a light-emitting diode (LED), a discharge lamp, an incandescent lamp, and a combination thereof with a spectroscope.

The photodetection device is not particularly limited as long as it can measure the absorbance at the wavelength of the detector absorption peak. For example, a conventionally known photodetection device may be used. Specifically, examples of the photodetection device include a photosensor, a photoconductive cell, a semiconductor photosensor, a phototube, a photomultiplier, etc. Preferably, the photodetection device may include a photosensor in view of ease of installation, for example. Preferably, the photosensor may measure absorbances at two wavelengths or more including the wavelength of the detector absorption peak and a wavelength that is different from the wavelength of the detector absorption peak. This is because when the absorbances at the two wavelengths can be measured, data of the absorbances can be generated and thereby the accuracy of judgment made by the judgment device described later further can be improved.

The position where the light source is disposed is not particularly limited as long as the position allows each of the yellow, magenta, and cyan inks to be irradiated with light. The light source may be disposed in the reset position, for example. Similarly, the position where the photodetection device is disposed is not particularly limited as long as the position allows the photodetection device to receive transmitted light from each of the yellow, magenta, and cyan inks. The photodetection device may be disposed inside the carriage 5 or on a side face of the carriage 5 located on the sides opposing each other.

When the light source and the photodetection device are disposed in the aforementioned positions, measurement of the absorbance is carried out with respect to each ink that flows in each ink flow passage between the ink cartridges containing the respective inks of yellow, magenta, and cyan and the nozzles of the ink-jet head 3. The measurement optical path length that is employed for the absorbance measurement is determined suitably according to, for example, the coloring agent concentration. For instance, it is in the range of 0.1 mm to 10 mm.

Figure 6:
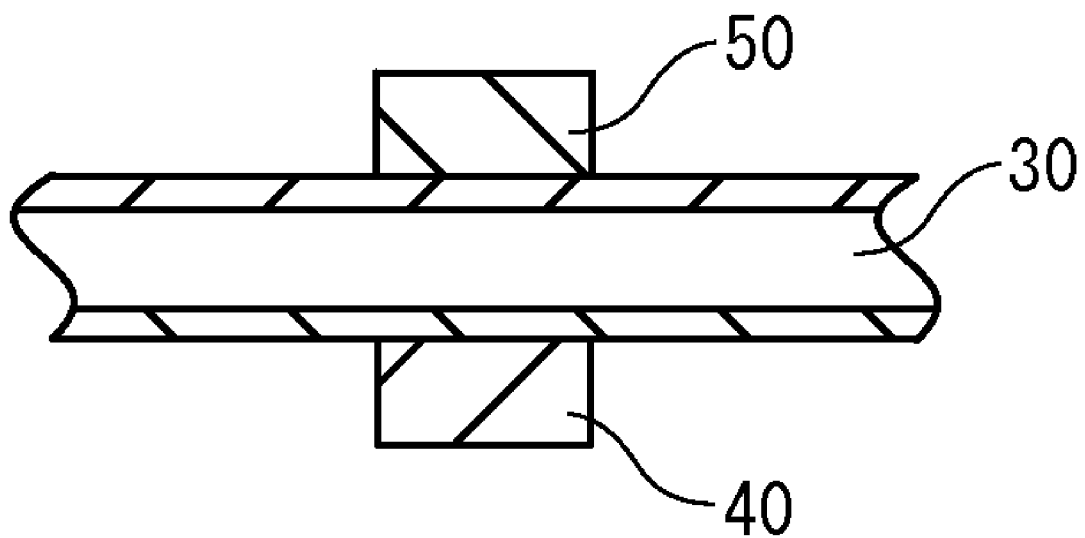
FIG. 6 is a sectional view that schematically shows an example of the positional relationship between a light source and a photodetection means in an ink-jet recording apparatus according to at least one aspect of the present invention.

An example of the positional relationship between the light source and the photodetection device is shown schematically in the sectional view in FIG. 6. In this example, the light source 40 is disposed under the ink flow passage 30. The photodetection device 50 is disposed above the ink flow passage 30 and in a position corresponding to a position above the light source 40.

In the ink-jet recording apparatus in which the inks of at least one aspect of the present invention are fed from ink cartridges to the ink-jet head through tubes, the photodetection device may be disposed in the ink cartridges, the ink flow passage, or the place before the nozzle inside the ink-jet head, while the light source may be disposed in a suitable position corresponding thereto, although it is not shown in the drawings. Preferably, the photodetection device is disposed in the ink cartridges.

The judgment device judges the type of the inks according to the data of the absorbances and generates the information of the inks contained in the ink cartridges. The data of the absorbances is generated as electric signals in the optical measurement device, for example. The electric signals may be digital information, for example. For instance, the judgment device refers to the data of the absorbances and a database in which the type of ink and the type of absorbance are associated with each other and thereby judges the type of ink. The judgment of the type of ink includes specifying the specific type of ink, for example. Furthermore, the judgment of the type of ink includes judging whether the ink contained in an ink cartridge is an appropriate ink, for example. Preferably, the judgment is performed automatically as soon as the ink cartridge is mounted on the ink-jet recording apparatus. However, the present invention is not limited to this. The judgment can be carried out by pressing a start button provided for the ink-jet recording apparatus after the ink cartridge is mounted on the ink-jet recording apparatus, for example.

Preferably, the judgment device further includes an appropriate ink information data, a collating device, and a data output device. The appropriate ink information data is, for instance, data in which the type of ink contained in the cartridge to be mounted on the ink-jet recording apparatus is associated with the absorbance at the wavelength of the detector absorption peak of the marker. The collating device collates the information of the ink contained in the ink cartridge and the appropriate ink information data to generate collated information. The collated information is, for example, information about whether the ink contained in the cartridge mounted on the ink-jet recording apparatus is an appropriate ink or not. The data output device outputs the collated information generated by the collating device. The data output device may be any system, device, and/or circuit as long as it can output the collated information. The collated information is output in such a manner that an alarm is triggered when the information of the ink contained in the ink cartridge and the appropriate ink information do not match with each other, an error message may be displayed on a display (for example, a liquid crystal display or other known display) provided for the ink-jet recording apparatus, etc.

EXAMPLES

Next, examples of the present invention are described together with comparative examples. However, the present invention is not limited by the following examples and comparative examples.

Examples 1 to 5

Ink composition components (Table 4) were stirred to be mixed together. Thereafter, the mixture was filtrated with a cellulose acetate membrane filter with a pore size of 3 μm (for instance manufactured by TOYO ROSHI KAISHA LTD.). Thus yellow inks for ink-jet recording of Examples 1 to 5 were obtained.

Examples 6 to 10

Ink composition components (Table 5) were stirred to be mixed together. Thereafter, the mixture was filtrated with a cellulose acetate membrane filter with a pore size of 3 μm (for instance manufactured by TOYO ROSHI KAISHA LTD.). Thus magenta inks for ink-jet recording of Examples 6 to 10 were obtained.

Examples 11 to 13

Ink composition components (Table 6) were stirred to be mixed together. Thereafter, the mixture was filtrated with a cellulose acetate membrane filter with a pore size of 3 μm (for instance manufactured by TOYO ROSHI KAISHA LTD.). Thus cyan inks for ink-jet recording of Examples 11 to 13 were obtained.

Comparative Examples 1 to 5

Ink composition components (Table 4) were stirred to be mixed together. Thereafter, the mixture was filtrated with a cellulose acetate membrane filter with a pore size of 3 μm (for instance manufactured by TOYO ROSHI KAISHA LTD.). Thus yellow inks for ink-jet recording of Comparative Examples 1 to 5 were obtained.

Comparative Examples 6 to 9

Ink composition components (Table 5) were stirred to be mixed together. Thereafter, the mixture was filtrated with a cellulose acetate membrane filter with a pore size of 3 μm (for instance manufactured by TOYO ROSHI KAISHA LTD.). Thus magenta inks for ink-jet recording of Comparative Examples 6 to 9 were obtained.

Comparative Examples 10 to 13

Ink composition components (Table 6) were stirred to be mixed together. Thereafter, the mixture was filtrated with a cellulose acetate membrane filter with a pore size of 3 μm (for instance manufactured by TOYO ROSHI KAISHA LTD.). Thus cyan inks for ink-jet recording of Comparative Examples 10 to 13 were obtained.

Evaluation

The inks of the respective examples and the respective comparative examples were measured and/or calculated for $A_2/A_3$, the color difference ($\Delta E$), the absorbance ($A_2$) at the wavelength of the detector absorption peak of the marker, and $A_1/A_2$. The specific measurement methods are described below. The measurement results are indicated below in Tables 4 to 6.

<$A_2/A_3$ and Absorbance ($A_2$) at Wavelength of Detector Absorption Peak of Marker>

The stock solutions of the yellow inks, the stock solutions of the magenta inks, and 10-fold dilutions (diluent solvent: water) of the cyan inks each were measured for the absorption curve using a spectrophotometer (trade name: UV3600, manufactured by Shimadzu Corporation). The measurement was carried out with a cell length of 1 mm using pure water as a reference. From the absorption curves thus obtained, the absorbances ($A_2$) at the wavelength of the detector absorption peak of the marker and the baseline absorbances ($A_3$) at the wavelength of the detector absorption peak were determined and then $A_2/A_3$ was calculated.

<Color Difference ($\Delta E$)>

1600-fold dilutions (diluent solvent: water) of the yellow inks, 1000-fold dilutions (diluent solvent: water) of the magenta inks, and 1000-fold dilutions (diluent solvent: water) of the cyan inks were subjected to color measurement using a spectrophotometer (trade name: UV3600, manufactured by Shimadzu Corporation). Then the L* value, a* value, and b* value of each ink were determined. The measurement was carried out with a cell length of 10 mm using pure water as a reference. The numerical values thus obtained were indicated as $L^*_1$, $a^*_1$, and $b^*_1$. These numerical values are according to the L* a* b* colorimetric system standardized in International Commission on Illumination (CIE) in 1976 (CIE 1976 (L* a* b*) colorimetric system) (see JIS (Japanese Industrial Standards) Z8729).

Next, a control ink was prepared by removing the marker from each of the inks of the respective examples and comparative examples and making up for a decrease in amount due to removal of the marker by water. The color measurement was carried out in the same manner as above and thereby the L* value, a* value, and b* value were determined. The measurement was carried out with a cell length of 10 mm using pure water as a reference. The numerical values thus obtained were indicated as $L^*_2$, $a^*_2$, and $b^*_2$.

The numerical values of $L^*_1$, $a^*_1$, and $b^*_1$ and $L^*_2$, $a^*_2$, and $b^*_2$ thus obtained were assigned to the following formula (1) and thereby the color difference (ΔE) was determined.

$$\Delta E = \{(L^*_1 - L^*_2)^2 + (a^*_1 - a^*_2)^2 + (b^*_1 - b^*_2)^2\}^{1/2} \quad (1)$$

<$A_1/A_2$>

1600-fold dilutions of the yellow inks (diluent solvent: water), 1000-fold dilutions of the magenta inks (diluent solvent: water), and 1000-fold dilutions of the cyan inks (diluent solvent: water) each were measured for the absorbance curve using a spectrophotometer (trade name: UV3600, manufactured by Shimadzu Corporation). The measurement was carried out with a cell length of 1 mm using pure water as a reference. The absorbance ($A_1$) at the wavelength of the maximum absorption peak of the coloring agent was determined from the resultant absorption curve. Then $A_1/A_2$ was calculated from the absorbance ($A_1$) at the wavelength of the maximum absorption peak of the coloring agent and the absorbance ($A_2$) at the wavelength of the detector absorption peak of the marker.

<Comprehensive Evaluation>

The comprehensive evaluation was carried out according to the following criteria with consideration given to the calculation result of $A_2/A_3$, the measurement result of the color difference (ΔE), the measurement result of the absorbance ($A_2$) at the wavelength of the detector absorption peak of the marker, and the calculation result of the $A_1/A_2$.

Comprehensive Evaluation Criteria

A: the case where all the conditions (I) to (III) and (V) are satisfied.

B: the case where all the conditions (I) to (III) are satisfied but the condition (V) is not satisfied.

C: the case where at least one of the conditions (I) to (III) is not satisfied.

TABLE 4

|  | Example | | | | | Comparative Example | | | | |
| --- | --- | --- | --- | --- | --- | --- | --- | --- | --- | --- |
|  | 1 | 2 | 3 | 4 | 5 | 1 | 2 | 3 | 4 | 5 |
| Coloring Agent | | | | | | | | | | |
| CAB-O-JET ® 270Y (1*) | 5.0 | 5.0 | 5.0 | 5.0 | 5.0 | 5.0 | 5.0 | 5.0 | 5.0 | 1.5 |
| (Absorption Peak Wavelength (nm)) | (417) | (417) | (417) | (417) | (417) | (417) | (417) | (417) | (417) | (417) |
| Marker | | | | | | | | | | |
| C.I. Direct Blue 199 | 0.05 | 0.015 | — | — | — | 0.15 | 0.005 | — | — | 0.001 |
| C.I. Acid Red 52 | — | — | — | — | — | — | — | 0.03 | — | — |
| C.I. Acid Blue 9 | — | — | 0.03 | — | — | — | — | — | — | — |
| C.I. Acid Blue 175 | — | — | — | 0.03 | — | — | — | — | — | — |
| CAB-O-JET ® 250C (1*) | — | — | — | — | 0.05 | — | — | — | 0.15 | — |
| (Absorption Peak Wavelength (nm)) | (682) | (682) | (629) | (658) | (615) | (682) | (682) | (566) | (615) | (682) |
| Glycerin | 26.0 | 26.0 | 26.0 | 26.0 | 26.0 | 26.0 | 26.0 | 26.0 | 26.0 | 26.0 |
| Triethylene glycol n-butyl ether | 4.0 | 4.0 | 4.0 | 4.0 | 4.0 | 4.0 | 4.0 | 4.0 | 4.0 | 4.0 |
| Water | Balance | Balance | Balance | Balance | Balance | Balance | Balance | Balance | Balance | Balance |
| $A_2/A_3$ | 1.7 | 1.2 | 1.2 | 1.4 | 1.4 | 3.0 | <u>1.1</u> | <u>1.1</u> | 2.3 | <u>1.0</u> |
| ΔE | 1.5 | 0.7 | 1.2 | 1.3 | 1.7 | <u>4.9</u> | 0.7 | 1.1 | <u>5.4</u> | 0.0 |
| Absorbance ($A_2$) | 4.1 | 3.0 | 6.1 | 3.8 | 8.1 | 7.5 | 2.6 | 10 | <u>13</u> | <u>0.77</u> |
| $A_1/A_2$ | 69 | 97 | 47 | 76 | 35 | 38 | 110 | 28 | 22 | 110 |
| Comprehensive Evaluation | A | A | A | A | A | C | C | C | C | C |

(unit: % by weight; the concentrations of the coloring agent and marker are indicated in terms of solid content.)

(1*) manufactured by Cabot Corporation

TABLE 5

|  | Example | | | | | Comparative Example | | | |
| --- | --- | --- | --- | --- | --- | --- | --- | --- | --- |
|  | 6 | 7 | 8 | 9 | 10 | 6 | 7 | 8 | 9 |
| Coloring Agent | | | | | | | | | |
| CAB-O-JET ® 260M (1*) | 5.0 | 5.0 | 5.0 | 5.0 | 5.0 | 5.0 | 5.0 | 5.0 | 5.0 |
| (Absorption Peak Wavelength (nm)) | (533) | (533) | (533) | (533) | (533) | (533) | (533) | (533) | (533) |
| Marker | | | | | | | | | |
| C.I. Direct Blue 199 | 0.05 | 0.01 | — | — | — | 0.1 | 0.005 | — | — |
| C.I. Acid Blue 9 | — | — | 0.03 | — | — | — | — | — | — |
| C.I. Acid Blue 175 | — | — | — | 0.03 | — | — | — | — | — |
| C.I. Acid Red 52 | — | — | — | — | — | — | — | 0.03 | — |
| CAB-O-JET ® 250C (1*) | — | — | — | — | 0.03 | — | — | — | 0.1 |
| (Absorption Peak Wavelength (nm)) | (682) | (682) | (629) | (658) | (615) | (682) | (682) | (566) | (615) |
| Glycerin | 26.0 | 26.0 | 26.0 | 26.0 | 26.0 | 26.0 | 26.0 | 26.0 | 26.0 |
| Triethylene glycol n-butyl ether | 4.0 | 4.0 | 4.0 | 4.0 | 4.0 | 4.0 | 4.0 | 4.0 | 4.0 |
| Water | Balance | Balance | Balance | Balance | Balance | Balance | Balance | Balance | Balance |
| $A_2/A_3$ | 2.1 | 1.2 | 1.3 | 1.5 | 1.2 | 3.2 | <u>1.1</u> | <u>1.0</u> | 1.8 |
| ΔE | 2.5 | 0.9 | 1.2 | 1.3 | 1.2 | <u>4.0</u> | 0.3 | 1.3 | <u>4.3</u> |
| Absorbance ($A_2$) | 3.2 | 1.9 | 4.0 | 2.9 | 7.3 | 4.9 | 1.7 | <u>86</u> | <u>11</u> |
| $A_1/A_2$ | 38 | 65 | 31 | 42 | 17 | 25 | 72 | <u>1.4</u> | <u>11</u> |
| Comprehensive Evaluation | A | A | A | A | A | C | C | C | C |

(unit: % by weight; the concentrations of the coloring agent and marker are indicated in terms of solid content.)
(1*) manufactured by Cabot Corporation

TABLE 6

|  | Example | | | Comparative Example | | | |
| --- | --- | --- | --- | --- | --- | --- | --- |
|  | 11 | 12 | 13 | 10 | 11 | 12 | 13 |
| Coloring Agent | | | | | | | |
| CAB-O-JET ® 250C (1*) | 5.0 | 5.0 | 5.0 | 5.0 | 5.0 | 5.0 | 5.0 |
| (Absorption Peak Wavelength (nm)) | (615) | (615) | (615) | (615) | (615) | (615) | (615) |
| Marker | | | | | | | |
| C.I. Acid Orange 122 | 0.1 | 0.03 | — | 0.2 | 0.01 | — | — |
| C.I. Acid Orange 80 | — | — | 0.05 | — | — | — | — |
| C.I. Direct Yellow 132 | — | — | — | — | — | 0.03 | — |
| C.I. Acid Red 289 | — | — | — | — | — | — | 0.03 |
| (Absorption Peak Wavelength (nm)) | (480) | (480) | (468) | (480) | (480) | (404) | (527) |
| Glycerin | 26.0 | 26.0 | 26.0 | 26.0 | 26.0 | 26.0 | 26.0 |
| Triethylene glycol n-butyl ether | 4.0 | 4.0 | 4.0 | 4.0 | 4.0 | 4.0 | 4.0 |
| Water | Balance | Balance | Balance | Balance | Balance | Balance | Balance |
| $A_2/A_3$ | 1.5 | 1.2 | 1.2 | 2.0 | <u>1.1</u> | <u>1.0</u> | <u>1.1</u> |
| ΔE | 2.7 | 0.8 | 1.5 | <u>4.8</u> | 0.4 | 0.9 | 1.0 |
| Absorbance ($A_2$) | 9.7 | 7.4 | 8.8 | <u>13</u> | 6.7 | <u>40</u> | <u>19</u> |
| $A_1/A_2$ | 25 | 32 | 27 | 18 | 36 | <u>6</u> | <u>12</u> |
| Comprehensive Evaluation | A | A | A | C | C | C | C |

(unit: % by weight; the concentrations of the coloring agent and marker are indicated in terms of solid content.)
(1*) manufactured by Cabot Corporation As can be seen from Tables 4 to 6, the inks of all the examples had excellent comprehensive evaluation results. Ink cartridges containing the inks of the respective examples were mounted on the ink-jet recording apparatus shown in FIG. 5. The ink-jet recording apparatus was set to judge the type of the inks. As a result, all the inks were judged as appropriate inks. In each example and comparative example, in order to calculate $A_1/A_2$, the absorbance ($A_1$) was measured. However, it is sufficient to measure the absorbance ($A_2$) alone in judging the type of the inks in an actual ink-jet recording apparatus. The ink of each comparative example did not allow the ink-jet recording apparatus to judge the type thereof correctly or even if it did allow the ink-jet recording apparatus to judge the type thereof, the color of ink is changed considerably due to an effect of the marker.

It will be obvious to those having skill in the art that many changes may be made in the above-described details of the preferred embodiments of the present invention. The scope of the present invention, therefore, should be determined by the following claims.

What is claimed is:

1. An ink for ink-jet recording comprising a coloring agent, wherein the coloring agent contains a pigment,
   the ink further contains a marker,
   the marker has a detector absorption peak for detecting the marker at a wavelength that is different from a wavelength of the maximum absorption peak of the coloring agent, and
   the coloring agent and the marker are contained in the ink in amounts that satisfy the following conditions (I) to (III):
   (I) about $1.2 \leq A_2/A_3$;
   (II) color difference ($\Delta E$) $\leq$ about 3; and
   (III) about $1 \leq A_2 \leq$ about 10 in terms of a measurement optical path length of 1 mm,
   where $A_2$ denotes an absorbance at the wavelength of the detector absorption peak of the marker,
   $A_3$ denotes a baseline absorbance at the wavelength of the detector absorption peak of the marker,
   $\Delta E = \{(L^*_1 - L^*_2)^2 + (a^*_1 - a^*_2)^2 + (b^*_1 - b^*_2)^2\}^{1/2}$,
   $L^*_1$ denotes an L* value of the ink,
   $L^*_2$ denotes an L* value of a control ink,
   $a^*_1$ denotes an a* value of the ink,
   $a^*_2$ denotes an a* value of the control ink,
   $b^*_1$ denotes a b* value of the ink,
   $b^*_2$ denotes a b* value of the control ink, and
   the control ink is an ink having the same composition as a composition of the ink except that water is used instead of the marker.

2. The ink according to claim 1, further satisfying the following condition (IV):
   (IV) about 50 nm $\leq |\lambda_1 - \lambda_2|$,
   where $\lambda_1$ denotes the wavelength of the maximum absorption peak of the coloring agent, and $\lambda_2$ denotes the wavelength of the detector absorption peak of the marker.

3. The ink according to claim 1, wherein with respect to the total amount of the ink, the amount of the coloring agent to be added is in a range of about 0.1% by weight to about 15% by weight, while the amount of the marker to be added is in a range of about 0.001% by weight to about 0.3% by weight.

4. The ink according to claim 1, wherein the condition (I) is about $1.5 \leq A_2/A_3$.

5. The ink according to claim 1, wherein the coloring agent and the marker are contained in the ink in amounts that further satisfy the following condition (V):
   (V) about $15 \leq A_1/A_2 \leq$ about 200,
   where $A_1$ denotes an absorbance at the wavelength of the maximum absorption peak of the coloring agent.

6. The ink according to claim 1, wherein the maximum absorption peak of the coloring agent is in a range of about 360 nm to about 450 nm, while the detector absorption peak of the marker is in a range of about 550 nm to about 780 nm.

7. The ink according to claim 1, wherein the maximum absorption peak of the coloring agent is in a range of about 500 nm to about 570 nm, while the detector absorption peak of the marker is in a range of about 600 nm to about 780 nm.

8. The ink according to claim 1, wherein the maximum absorption peak of the coloring agent is in a range of about 570 nm to about 780 nm, while the detector absorption peak of the marker is in a range of about 450 nm to about 500 nm.

9. The ink according to claim 1, wherein both the wavelengths of the maximum absorption peak of the coloring agent and the detector absorption peak of the marker are in a visible light range.

10. An ink cartridge comprising an ink for ink-jet recording,
    wherein the ink contains a coloring agent and a marker,
    the coloring agent contains a pigment,
    the marker has a detector absorption peak for detecting the marker at a wavelength that is different from a wavelength of the maximum absorption peak of the coloring agent, and
    the coloring agent and the marker are contained in the ink in amounts that satisfy the following conditions (I) to (III):
    (I) about $1.2 \leq A_2/A_3$;
    (II) color difference ($\Delta E$) $\leq$ about 3; and
    (III) about $1 \leq A_2 \leq$ about 10 in terms of a measurement optical path length of 1 mm,
    where $A_2$ denotes an absorbance at the wavelength of the detector absorption peak of the marker,
    $A_3$ denotes a baseline absorbance at the wavelength of the detector absorption peak of the marker,
    $\Delta E = \{(L^*_1 - L^*_2)^2 + (a^*_1 - a^*_2)^2 + (b^*_1 - b^*_2)^2\}^{1/2}$,
    $L^*_1$ denotes an L* value of the ink,
    $L^*_2$ denotes an L* value of a control ink,
    $a^*_1$ denotes an a* value of the ink,
    $a^*_2$ denotes an a* value of the control ink,
    $b^*_1$ denotes a b* value of the ink,
    $b^*_2$ denotes a b* value of the control ink, and
    the control ink is an ink having the same composition as a composition of the ink except that water is used instead of the marker.

11. The ink cartridge according to claim 10, wherein the ink further satisfies the following condition (IV):
    (IV) about 50 nm $\leq |\lambda_1 - \lambda_2|$,
    where $\lambda_1$ denotes the wavelength of the maximum absorption peak of the coloring agent, and $\lambda_2$ denotes the wavelength of the detector absorption peak of the marker.

12. The ink cartridge according to claim 10, wherein the coloring agent and the marker are contained in the ink in amounts that further satisfy the following condition (V):
    (V) about $15 \leq A_1/A_2 \leq$ about 200,
    where $A_1$ denotes an absorbance at the wavelength of the maximum absorption peak of the coloring agent.

13. The ink cartridge according to claim 10, wherein both the wavelengths of the maximum absorption peak of the coloring agent and the detector absorption peak of the marker are in a visible light range.

14. An ink-jet recording apparatus on which an ink cartridge is mounted,
    wherein the ink cartridge contains an ink for ink-jet recording,
    the ink contains a coloring agent and a marker,
    the coloring agent contains a pigment,
    the marker has a detector absorption peak for detecting the marker at a wavelength that is different from a wavelength of the maximum absorption peak of the coloring agent, the coloring agent and the marker are contained in the ink in amounts that satisfy the following conditions (I) to (III):

(I) about $1.2 \leqq A_2/A_3$;

(II) color difference ($\Delta E$)$\leqq$about 3; and (III) about $1 \leqq A_2 \leqq$ about 10 in terms of a measurement optical path length of 1 mm, where $A_2$ denotes an absorbance at the wavelength of the detector absorption peak of the marker, $A_3$ denotes a baseline absorbance at the wavelength of the detector absorption peak of the marker, $\Delta E = \{(L^*_1 - L^*_2)^2 + (a^*_1 - a^*_2)^2 + (b^*_1 - b^*_2)^2\}^{1/2}$, $L^*_1$ denotes an L* value of the ink, $L^*_2$ denotes an L* value of a control ink, $a^*_1$ denotes an a* value of the ink, $a^*_2$ denotes an a* value of the control ink, $b^*_1$ denotes a b* value of the ink, $b^*_2$ denotes a b* value of the control ink, and the control ink is an ink having the same composition as a composition of the ink except that water is used instead of the marker, the ink-jet recording apparatus includes an optical measurement means and a judgment means, the optical measurement means measures an absorbance of the ink at the wavelength of the detector absorption peak of the marker to generate data of the absorbance, and the judgment means judges the type of the ink according to the data of the absorbance to generate information of the ink contained in the ink cartridge.

15. The ink-jet recording apparatus according to claim 14, wherein the ink further satisfies the following condition (IV):

(IV) about 50 nm$\leqq |\lambda_1 - \lambda_2|$, where $\lambda_1$ denotes the wavelength of the maximum absorption peak of the coloring agent, and $\lambda_2$ denotes the wavelength of the detector absorption peak of the marker.

16. The ink-jet recording apparatus according to claim 14, wherein the coloring agent and the marker are contained in the ink in amounts that further satisfy the following condition (V):

(V) about $15 \leqq A_1/A_2 \leqq$ about 200, where $A_1$ denotes an absorbance at the wavelength of the maximum absorption peak of the coloring agent.

17. The ink-jet recording apparatus according to claim 14, wherein both the wavelengths of the maximum absorption peak of the coloring agent and the detector absorption peak of the marker are in a visible light range.

18. The ink-jet recording apparatus according to claim 14, wherein the judgment means further comprises an appropriate ink information data, a collating means, and a data output means, the collating means collates information of the ink contained in the ink cartridge and the appropriate ink information data to generate collated information, and the data output means outputs the collated information generated by the collating means.

19. The ink-jet recording apparatus according to claim 14, wherein the optical measurement means comprises a photosensor.

20. The ink-jet recording apparatus according to claim 19, wherein the photosensor measures absorbances at two wavelengths or more including the wavelength of the detector absorption peak and a wavelength that is different from the wavelength of the detector absorption peak, and the optical measurement means generates data of the absorbances from the absorbances of the two wavelengths.

\* \* \* \* \*